UNITED STATES PATENT OFFICE.

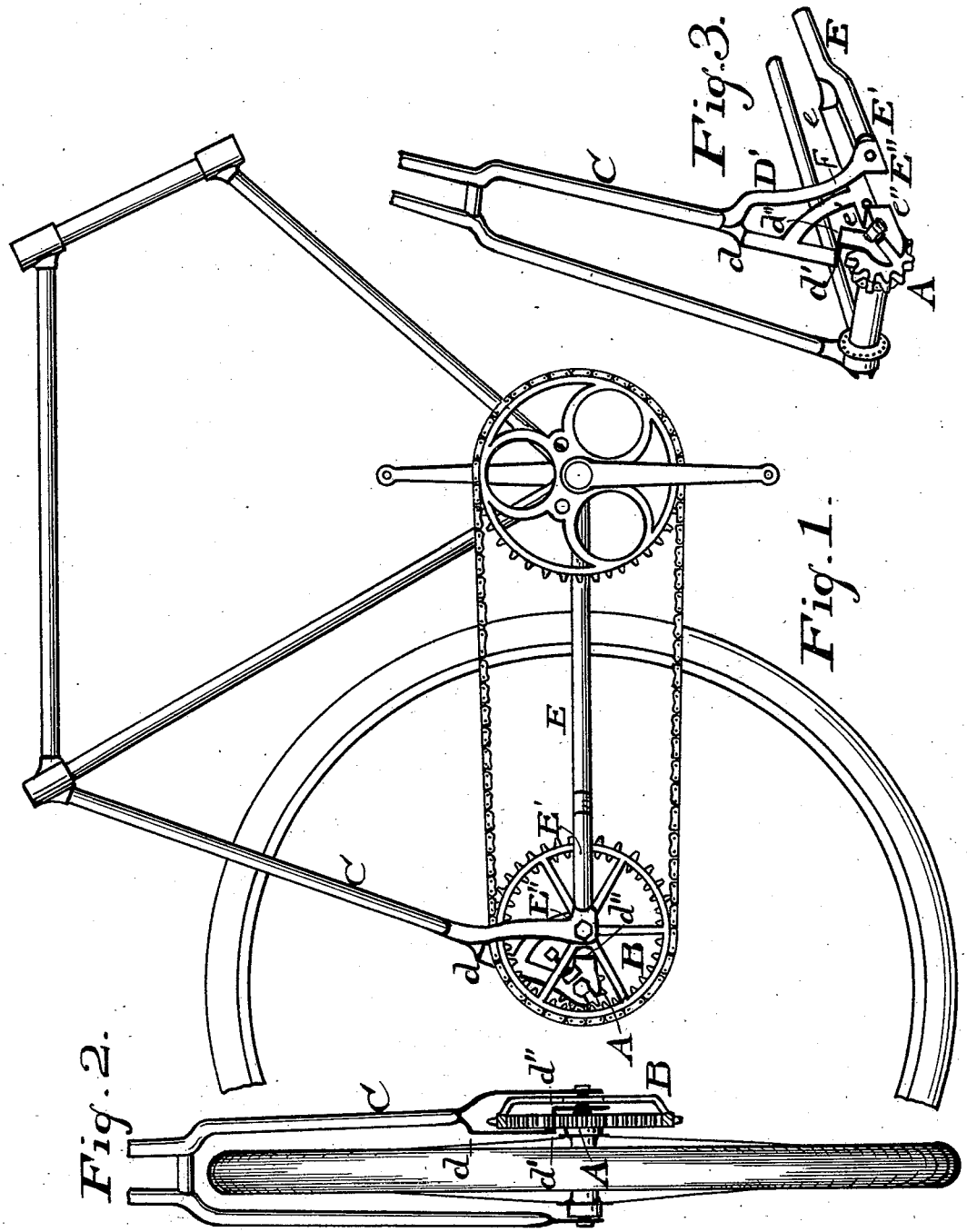

ENOCH HAINES AND ROBERT MONAHAN, OF LAKEWOOD, OHIO.

BICYCLE.

SPECIFICATION forming part of Letters Patent No. 614,101, dated November 15, 1898.

Application filed April 18, 1898. Serial No. 678,090. (No model.)

*To all whom it may concern:*

Be it known that we, ENOCH HAINES and ROBERT MONAHAN, citizens of the United States of America, and residents of Lakewood, county of Cuyahoga, and State of Ohio, have invented certain new and useful Improvements in Bicycles, of which the following is a specification.

This invention relates to bicycles, and has for its object to provide increased speed and greater ease of propelling power; and the invention consists in the combination, with the treadle-sprocket, of a second sprocket coupled by driving-chain therewith and having internal gear-teeth meshing with a pinion on the axle and the peculiar construction and adaptation of framework for mounting said second sprocket-wheel and pinion, substantially as hereinafter described, and pointed out in the claim.

In the accompanying drawings, Figure 1 is a side elevation of a portion of a bicycle having our improvement attached. Fig. 2 is a rear end elevation of the same, showing our improvement, partly in section, as applied to the axle of the driving-wheel. Fig. 3 is a perspective view of the rear ends of the forks of the framework, showing the form and construction of the same for supporting the said second sprocket in connection with the pinion on the hub of the driving-wheel.

A is a pinion placed on the end of the hub of the driving-wheel in the place of the small sprocket now used. B is a sprocket-wheel having internal gear-teeth meshing with and operating the said pinion A. The right-side branch C of the rear fork is shortened and provided with a subfork D of peculiar construction, adapting it for supporting sprocket B. The inside branch of said subfork D has a bend $d$, turning said branch inward to provide room for sprocket B to be placed on a line with the pinion A. The said branch is again bent outward at $d'$ over the pinion A and again downward at $d''$ and forms the bearing for the axle of the driving-wheel and the pinion. The right-side branch of the side fork E is also provided with a subfork, which is also bent inward at $e$ in like manner to bend $d$ and again outward at $e'$, then again at $e''$ it is bent back and is joined to the end of $d''$, which forms the axle-bearing. These two branches of the subforks $d$ and E are joined by a curved brace F. The outer branches D' and E' of said subforks D and E are joined at E'' and form the outer bearing for the sprocket B. The inner bearing for said sprocket is near the bend $e'$ in the inner branch of said fork E.

Having described our invention, what we claim, and desire to secure by Letters Patent, is—

The combination with the frame and hub of the driving-wheel of a bicycle, of the pinion A, mounted on the hub, the internal geared sprocket-wheel B, connected by chain with the treadle-sprocket, and mounted in the frame having the support therefor, consisting of the subfork D, the inner branch having the bends $d$, $d'$ and $d''$, the subfork E' on the brace E, the inner branch having the bends $e$, $e'$ and $e''$, said bent inner branches joined at their ends and forming the bearing for the axle of the hub, and also joined by the curved brace E', the two outer branches of said subforks, D' and E', joined at E'' and forming the outer bearing for the axle of sprocket B, all constructed and combined to operate as and for the purpose specified.

Signed by us, at Cleveland, Ohio, this 8th day of April, 1898.

ENOCH HAINES.
ROBERT MONAHAN.

Witnesses:
GEO. W. TIBBITTS,
J. GOLDBERG.